United States Patent Office 3,667,776
Patented June 6, 1972

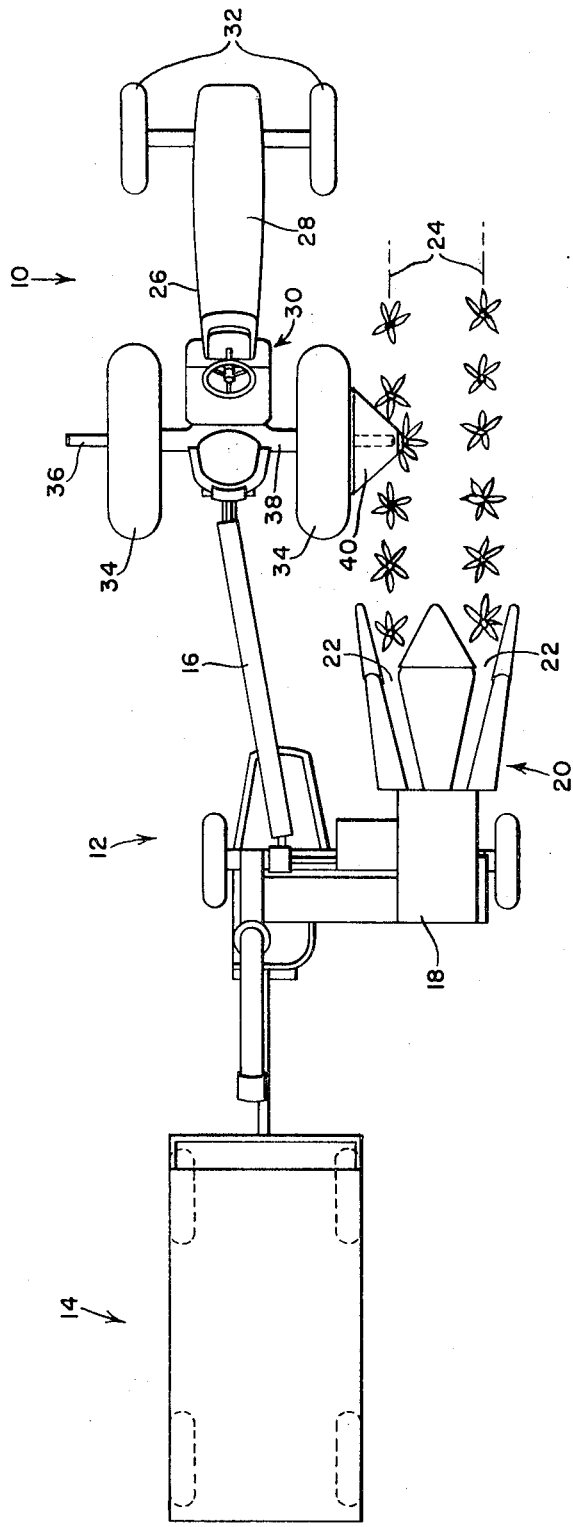
FIG. I
INVENTORS
KENNETH E. MURPHY
WILLIAM M. EUBANK
LAMAR WILLIAMS

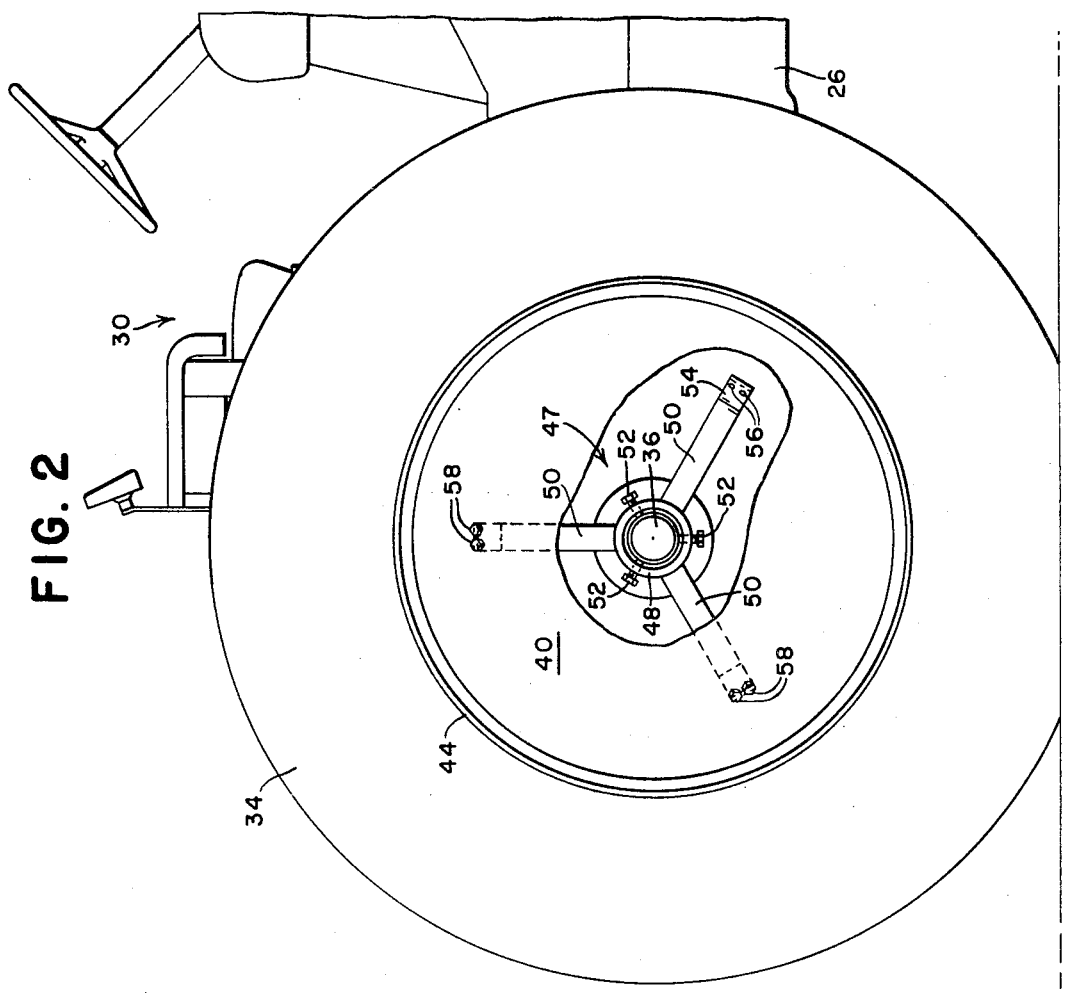
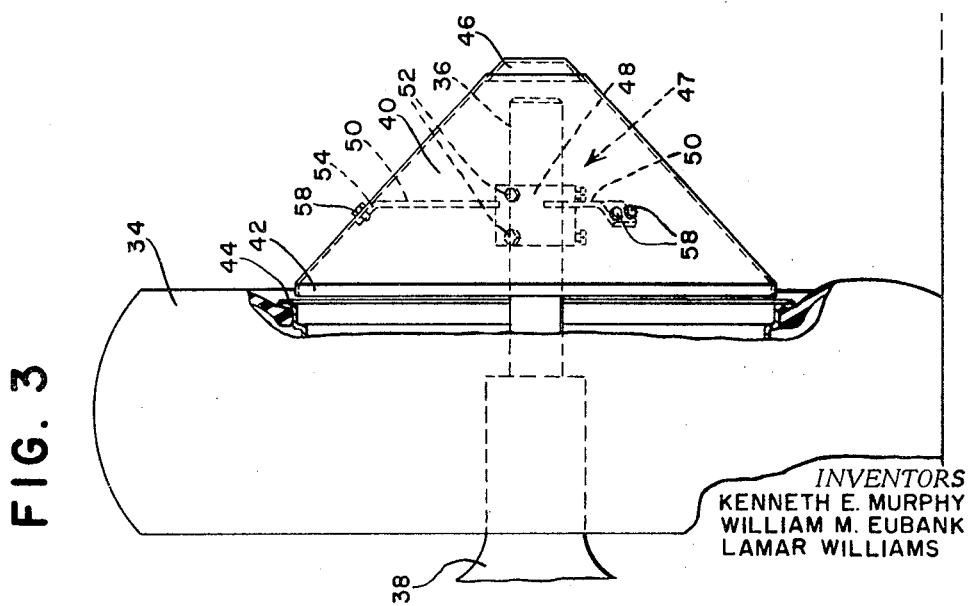

3,667,776
CROP DEFLECTOR ATTACHMENT FOR
AGRICULTURAL TRACTORS
Kenneth Earl Murphy, Dike, William Marion Eubank, Waterloo, and Lamar Williams, Cedar Falls, Iowa, assignors to Deere & Company, Moline, Ill.
Filed June 26, 1970, Ser. No. 50,229
Int. Cl. B60r 27/00
U.S. Cl. 280—150 R
6 Claims

ABSTRACT OF THE DISCLOSURE

An attachment for deflecting crops around that portion of the rear axle of an agricultural tractor projecting outwardly from the ground-engaging drive wheel mounted thereon. The attachment comprises a cone-shaped member releasably mounted on and substantially enclosing the projecting outer end portion of the axle, the member being mounted coaxially with the wheel and including a conical outer surface extending between a relatively large end portion adjacent to the wheel and a relatively small end portion adjacent to the outer end of the axle. The cone-shaped member is mounted on the axle by means of an assembly substantially enclosed by the member and releasably connectible to the axle outer end portion, the assembly including a plurality of radially extending portions on which the member is releasably mountable.

BACKGROUND OF THE INVENTION

The present invention relates generally to agricultural tractors, and more particularly to an attachment for deflecting crops around the rear axle of such a tractor.

For operations requiring maximum traction or flotation, such as plowing, disking, etc., large, high-horsepower tractors are commonly equipped with a pair of drive wheels, rather than the usual single wheel, on each end of the rear axle. Such a dual wheel arrangement requires a much longer rear axle than that normally used, and greatly increases the overall width of the tractor. For certain other applications, however, traction and flotation are relatively minor problems, and a minimum tractor width is required. A tractor used for pulling a forage harvester, for example, does not require a great deal of traction, due to the relatively light draft load of such an implement, though it must have a minimum width to prevent interference between the drive wheels and the adjacent row of crops being harvested. If it is desired to use a tractor equipped with dual wheels to pull a forage harvester, the outside pair of wheels must therefore be removed from the axle and the inside pair adjusted to a narrow tread position. Although this adjustment will prevent interference between the wheels and the crop row, a new source of interference is presented by that portion of the axle extending outwardly from the remaining wheel. Such interference, the cause of considerable harvesting loss, can presently be eliminated only by installing a shorter, standard length axle, a difficult and time-consuming operation.

SUMMARY OF THE INVENTION

It is, accordingly, a primary object of the present invention to provide an attachment for use with agricultural tractors equipped with a longer than normal axle, which attachment will prevent interference by the axle with an adjacent row of corps. More particularly, it is an object to provide an attachment for gently deflecting such crops around the outer end of the axle. It is a further object to provide such an attachment that can be quickly and easily mounted on and removed from the outer end of the axle, and one that is both simple and economical to manufacture.

These and other objects are achieved, according to the invention, by the provision of a deflector member releasably mounted on and substantially enclosing the projecting outer end portion of the axle. The outer surface of the member defines a segment of a right circular cone, the surface being oriented coaxially with the axis of rotation of the wheel and tapering from a relatively large end adjacent to the wheel to a relatively small end adjacent to the outer end of the axle. A mounting assembly is releasably connected to that portion of the axle enclosed by the deflector member and includes a plurality of radially extending portions on which the member is releasably mountable. The member rotates with the wheel and axle assembly as the tractor advances along the crop row, but due to its conical shape and coaxial orientation, a constant angle of deflection is maintained relative to the row.

BRIEF DESCRIPTION OF THE DRAWINGS

The preferred embodiment of the invention will be described in conjunction with the accompanying drawings in which:

FIG. 1 is a plan view of an agricultural tractor and related equipment utilized in a forage harvesting operation, the tractor being equipped with the deflector attachment of the present invention;

FIG. 2 is an enlarged, side elevation view of the rear portion of the tractor of FIG. 1, with portions broken away to more clearly illustrate the invention; and FIG. 3 is an enlarged rear elevation view of the right rear wheel of the tractor, with portions broken away for clarity.

DESCRIPTION OF THE PREFERRED EMBODIMENT

Illustrated in FIG. 1 is the equipment conventionally used in a forage harvesting operation, the equipment including a tractor 10, a forage harvester 12 pulled and powered by the tractor, and a forage wagon 14 connected to the rear of the harvester 12. The harvester 12 is of the conventional side draft type, and includes an L-shaped frame having a generally fore-and-aft draft member 16 and a transverse, wheel-supported section 18. A gathering head 20 is mounted on the outer end of the section 18, and includes a pair of rearwardly-converging crop receiving openings 22 for receiving the two rows of crops extending along the right side of the tractor 10, indicated generally at 24. To avoid excessive side draft, the gathering head 20 of the harvester is located relatively close to the right side of the tractor 10, resulting in a minimum clearance between the tractor and the adjacent crop row 24.

The tractor 10 is of conventional design and includes a relatively narrow, elongated frame structure 26 supporting an internal combustion engine (not shown) beneath a hood 28, and an operator's platform 30. The frame 26 is carried on a pair of relatively small front steerable wheels 32 and a pair of relatively large rear drive wheels 34. The rear wheels 34 are rigidly mounted on the opposite end portions of a cylindrical, transverse, driven axle 36, the axle and final drive mechanism being supported in a housing 38 constituting a portion of the tractor frame structure 26. Axles of different lengths are commonly supplied for use with tractors of the type illustrated, to accommodate the various drive wheel arrangements required for the different ground conditions, row widths, and implement applications normally encountered. For example, a longer than normal axle is commonly provided for applications requiring a wider than normal tread, or those requiring dual wheels on each side of the tractor. However, a tractor equipped with such an extra long axle is not normally suited for pulling a forage harvester, since, as indicated in FIG. 1, the right outer end of the axle extends into and interferes with the adjacent crop row. For this application, it has been necessary in the past to replace the extra long axle with one of shorter, standard length. This necessity is eliminated by the crop deflector attachment of the present invention, however, which acts to gently deflect the crops in the adjacent row around the outer end of the axle, thereby preventing interference with the row by the axle and eliminating what would otherwise be a substantial source of harvesting loss.

The attachment, illustrated in detail in FIGS. 2 and 3, comprises a large, conical shield or deflector member 40 releasably mounted on and completely enclosing that portion of the axle 36 extending outwardly from the drive wheel 34. The outer surface of the member 40 defines a segment of a right circular cone, and the member is oriented coaxially with the axle 36, such that the portion thereof contacting the crops defines a constant angle relative to the crop row as the member rotates with the wheel 34. As detailed in FIG. 3, the large inner end of the member 40 includes a short, cylindrical lip 42 which terminates inwardly in close proximity to the rim 44 of the wheel 34, thereby preventing foreign objects from entering the area enclosed by the member. The same function is served by a cap 46 enclosing the small outer end of the member.

A mounting assembly, indicated generally by the numeral 47, serves to releasably mount the deflector member 40 on the outer end of the axle 36 for rotation therewith, the assembly being enclosed by the member 40 and comprising a sleeve collar 48 having three equally-spaced connecting members 50 fixed to and extending radially outwardly from its outer surface. Three equally-spaced pairs of set screws 52 in the sleeve or collar 48 serve to rigidly mount the collar on the axle, and permit accurate concentric and angular adjustment of the collar relative to the axle. The outer end portions 54 of the members 50 are bent inwardly to conform with the angle of the inner wall of the deflector member 40, and each contains a pair of threaded holes 56 in register with a pair of holes in the wall of the member 40. A pair of capscrews 58 extend through the holes in the member 40 and threadably engage the holes 56 in each connecting member 50.

The attachment is mounted on the tractor axle in the following manner. The mounting assembly 47 is first inserted on the end of the axle and the six set screws 52 in the sleeve or collar 48 are uniformly tightened, thus rigidly mounting the assembly 47 concentrically on the axle. The deflector member 40 is then placed in position on the assembly, with the three pairs of holes in the wall of the member 40 aligned with the holes 56 in the ends of the connecting members 50, and the six capscrews 58 are screwed into the holes 56, thereby rigidly connecting the member 40 to the mounting assembly. The removal of the attachement is a mere reversal of these steps. In operation, as shown in FIG. 1, the angled leading edge of the attachment engages the crops in the adjacent row as the tractor advances therealong, and deflects them gently outwardly around the end of the axle 36.

We claim:

1. A crop deflector attachment for use with a tractor having an axle with a ground-engaging wheel mounted thereon, said axle including an outer end portion extending transversely outwardly of said wheel, said attachment comprising: a deflector member for substantially enclosing said axle outer end portion, said member having a relatively large inner end portion positionable adjacent to said wheel and a relatively small outer end portion positionable adjacent to the outer end of said axle; a sleeve releasably mountable on said axle outer end portion; a plurality of connecting members fixed to said sleeve and extending radially outwardly therefrom; and means for releasably mounting said deflector member on the outer ends of said connecting members.

2. The invention defined in claim 1 wherein said deflector member includes a surface extending between its inner and outer end portions and around the outer end portion of said axle, said surface being generated by a line revolved about the axis of rotation of said wheel.

3. The invention defined in claim 2 wherein said surface defines a segment of a right circular cone.

4. A crop deflector attachment for use with a tractor having a rotatable axle and a ground-engaging wheel mounted on said axle for rotation therewith, said axle including an outer end portion extending transversely outwardly of said wheel, said attachment comprising: a deflector member for substantially enclosing said outer end portion, said member having a relatively large inner end portion positionable adjacent to said wheel, a relatively small outer end portion positionable adjacent to the outer end of said axle, and a surface extending between said inner and outer end portions and around said outer end portion of said axle, said surface being generated by a line revolved about an axis extending through said end portions; a sleeve; means for releasably mounting said sleeve concentrically on said outer end portion of said axle; a plurality of connecting members fixed to and extending outwardly from said sleeve; and means for releasably mounting said deflector member on the outer ends of said connecting members coaxially with said outer end portion of said axle and for rotation therewith.

5. In combination with a tractor having a rotatable axle with a ground-engaging wheel mounted thereon, said axle including an outer end portion extending outwardly of the wheel, an attachment for deflecting crops around the outer end portion of the axle comprising: a deflector member substantially enclosing the outer end portion of the axle and having an outer surface formed about the axis of rotation thereof; and means releasably mounted on the outer end portion of the axle and substantially enclosed by the deflector member for mounting the member on the axle for rotation therewith, said mounting means including a plurality of radially extending portions on which the deflector member is releasably mountable.

6. The invention defined in claim 5 wherein said mounting means includes means for adjusting the position of the deflector member relative to the axis of rotation of the axle.

References Cited

UNITED STATES PATENTS 416,556   12/1889   Borreson _____ 301—108 SC

BENJAMIN HERSH, Primary Examiner

R. R. SONG, Assistant Examiner

U.S. Cl. X.R.

301—108